United States Patent [19]

Hendrickson et al.

[11] Patent Number: 4,531,370
[45] Date of Patent: Jul. 30, 1985

[54] BRAKE ACTUATION ASSEMBLY

[75] Inventors: Richard T. Hendrickson, South Bend, Ind.; Larry G. Lohraff, Berrien, Mich.

[73] Assignee: The Bendix Corporation, Southfield, Mich.

[21] Appl. No.: 437,940

[22] Filed: Nov. 1, 1982

[51] Int. Cl.³ .................. B60T 13/14; F15B 9/10; F15B 13/10
[52] U.S. Cl. .................... 60/554; 60/547.1; 91/369 A; 91/391 R; 92/169
[58] Field of Search ............ 60/547.1, 589, 562, 60/554; 92/13.6, 169.2; 91/376 R, 369 A, 391 R

[56] References Cited

U.S. PATENT DOCUMENTS

| 2,900,962 | 8/1959 | Ingres | 60/547.1 |
| 2,957,454 | 10/1960 | Stelzer | 60/551 |
| 3,408,815 | 11/1968 | Stelzer | 60/551 |
| 4,282,799 | 8/1981 | Takeuchi | 60/554 |
| 4,400,943 | 8/1983 | Belart | 60/562 |

FOREIGN PATENT DOCUMENTS 2087016 5/1982 United Kingdom ............ 92/169 A

Primary Examiner—Robert E. Garrett
Assistant Examiner—H. Edward Li
Attorney, Agent, or Firm—Leo H. McCormick, Jr.; Ken C. Decker

[57] ABSTRACT

A brake actuation assembly 10 having a master cylinder 12 attached to a stationary wall (14) of a vehicle and a power assist apparatus 16. Linkage 66 connects a movable wall 125 in the power assist apparatus 16 with pistons 64 and 68 in chambers 60 and 62 in the master cylinder 12. A valve 133 responds to an input from an operator to allow a pressure differential to be created across wall 125. The pressure differential moves the wall 125 while at the same time the linkage moves pistons 64 and 68 to pressurize fluid in the master cylinder 12. An adjustment mechanism 82 acts on the piston 68 to control the timing of the interruption of fluid communication between a reservoir 46 and chambers 60 and 62 as a direct function of movement of wall 125.

12 Claims, 2 Drawing Figures

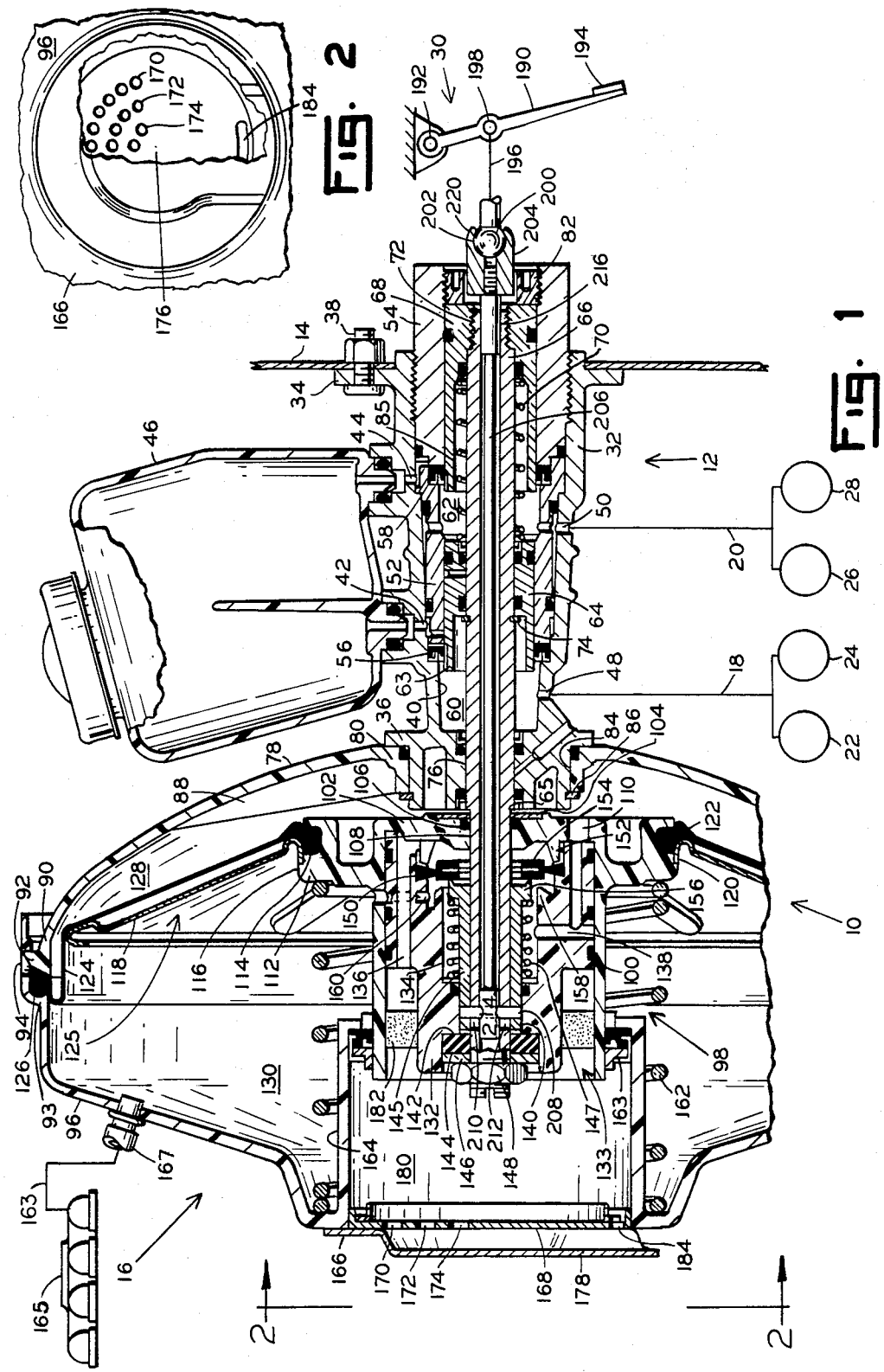

BRAKE ACTUATION ASSEMBLY

This invention relates to a brake actuation assembly having a power assist apparatus attached to a master cylinder which is fixed to a stationary member. An adjustment mechanism in the master cylinder positions the pistons therein to control the timing of the interruption of fluid communication to a reservoir to substantially reduce the lost motion associated with the movement of a brake pedal and actuation of wheel brakes of a vehicle.

Recent concern with respect to weight of components in automobiles have led to the development of lightweight vacuum brake boosters. When such brake boosters are attached to the fire wall of a vehicle during some brake applications, the input force transmitted from the brake pedal can deform or cause a deformation in the brake booster. This deformation is experienced as lost pedal motion which can result in an increase in the time to effect a brake application.

U.S. Pat. Nos. 2,603,066 and 2,900,962 issued July 15, 1952, and Aug. 25, 1959, respectively, disclose brake actuation assemblies having a master cylinder with a power assist mechanism attached to the end thereof. The master cylinder is fixed to a stationary member of the vehicle. This structure substantially eliminates lost pedal motion caused by deformation of the housing of the power assist mechanism. While investigating the operation of such puller type brake boosters, it was discovered that the overall reduction of lost pedal motion, while improved, was not eliminated. Further analyzation disclosed that a primary cause of lost pedal motion occured because of the delay in the fluid pressure buildup in the master cylinder caused by delay in closing the compensation ports to the fluid reservoir of the master cylinder.

SUMMARY OF THE INVENTION

In the brake actuation assembly disclosed herein, an adjustment mechanism positions the pistons of the master cylinder with respect to the compensation ports to control the timing of the interruption of the fluid communication therebetween to substantially synchronize the movement of the pistons with the movement of the movable wall in the power assist mechanism. Thus, the lost pedal motion is substantially reduced to essentially the travel associated with the actuation of the control valve in the power assist mechanism.

In addition, the rear shell of the power assist mechanism has a dome-like structure which resists deflection when subjected to a pressure differential load such as developed during the development of the operational output required to effect a brake application.

Thus, the brake actuation assembly provides an advantage in substantially reducing lost pedal motion caused by both deformation of the housing of the power assist mechanism and the closing of the compensation ports of the master cylinder.

It is, therefore, an object of this invention to provide a brake actuation assembly with an adjustment mechanism for positioning the pistons in a master cylinder with respect to the compensator ports to a reservoir and thereby control the timing of the interruption of the communication to the pressurizing chambers on movement of the pistons by an input force developed by movement of a wall in a pressure differential operation power assist mechanism.

BRIEF DESCRIPTION OF THE DRAWINGS

The invention will now be described with reference to the accompanying drawings wherein:

FIG. 1 is a schematic illustration of a brake actuation assembly with a sectional view of a master cylinder and power assist mechanism; and FIG. 2 is an end view taken along line 2–2 of FIG. 1 with a partial sectional view of an end cap through which air is communicated to the power assist mechanism.

DETAILED DESCRIPTION OF THE INVENTION

The brake actuation assembly 10 shown in FIG. 1 includes a master cylinder 12 which is fixed to a stationary member or wall 14 in a vehicle, a power assist apparatus 16 attached to the end of the master cylinder 12, conduits 18 and 20 for connecting the master cylinder with brakes associated with wheels 22, 24, 26, and 28 of the vehicle and an actuator member 30 through which an input force from the operator is transmitted from an operator to the power assist apparatus 16.

In more particular detail, the master cylinder 12 has a housing 32 with a first flange 34 and a second flange 36. A plurality of bolts 38, only one of which is shown, fix housing 32 to the stationary wall 14. Housing 32 has a stepped bore 40 therein with ports 42 and 44 connected to reservoir 46 in addition to ports 48 and 50 to which conduits 18 and 20 are connected. A sleeve 52 of a type disclosed in U.S. Pat. No. Re. 31,080 is positioned in bore 40 by an end bearing 54. Cup seals 56 and 58 are positioned in bore 40 by sleeve 52 and end bearing 54. A first piston 64 which engages seal 56 and sleeve or tube 66 cooperates with housing 32 to define a first chamber 60. Communication from reservoir 46 to chamber 60 through port 42 is controlled by cup seal 56.

A second piston 68 attached to the end of sleeve or tube 66 by threaded connection 72 engages cup seal 58 to cooperate with sleeve 52 and piston 64 to define a second chamber 62. A spring 70 which is located between pistons 64 and 68 urges piston 64 against a stop 74 on sleeve or tube 66 to define the limits of chamber 60 and 62. An adjustment mechanism 82 attached to bearing 54 engages piston 68 and moves end 85 with respect to cup seal 58 to define the opening from port 44 to chamber 62 with piston 68 in the rest position as shown. Since piston 64 is urged against stop 74, the same relationship is established between end 63 and seal 56 to establish an opening from port 42 to chamber 60. Tube or sleeve 66 which is attached to piston 68 extends through opening 76 into the power assist apparatus 16.

The power assist apparatus has an end shell 78 which has a dome or spherical shape. An annular lip or rib 80 on shell 78 rests on shoulder 84 that extends from flange 36. A snap ring 86 attached to housing 32 engages shoulder 84 to join shell 78 to housing 32. A plurality of radial ribs 88, only one of which is shown, extend from annular rib or lip 80 to provide resistance to deflection of shell 78. The periphery or base 90 of the dome shaped shell 78 has a series of radial tabs 92 that engage or snap into a slot 94 on a front shell 96.

A hub member 98 has a cylindrical body 100 with an integral end 102. A backing washer 104 and seal 106 surround an opening 108 in end 102. Sleeve 66 extends through opening 108 into the hub 98. An opening or passage 110 in end 102 provides for fluid communication through the hub member 98. A flange 112 on cylindrical body 100 has a groove 114 located adjacent shoulder 116. A backing plate 118 has an end 120 that is urged against a shoulder 116 by a bead 122 on diaphragm 124. A bead 126 on diaphragm 124 is located between the base 90 of shell 78 and groove 93 on the periphery of shell 96.

Shell 78, diaphragm 124, hub 98 and sleeve 66 define a chamber 128 within the power assist apparatus 16. While shell 96, diaphragm 124 and hub 98 define a chamber 130 within the power assist apparatus 16.

A control valve arrangement 133 located in hub 98 has a cylindrical body 132 with a bore 134 having a first passage 136 connected to the surrounding environment and a second passage 138 connected to opening 110 in end 102 of hub member 98. A bearing surface 140 is sealed with respect to sleeve or cylindrical tube 145 which is concentrically positioned on sleeve 66. A reaction disc 144 and retainer 146 are located on sleeve 66 adjacent shoulder 142. A fastener 148 attached to sleeve 66 acts on retainer 146 to hold a bead 150 of poppet 154 between cylindrical body 132 and annular projection 152 on end 102. Fastener 148 is tightened until such time that backing washer 104 engages shoulder 65 on sleeve 66. At the same time spring 147 acts on sleeve 145 to urge atmospheric seat 156 against poppet 154 to allow free communication between chambers 130 and 128 by way of opening 110, passage 138, bore 134, vacuum seat 158 and passage 160. Return spring 162 which is concentric to guide 164 that extends from shell 96 toward shell 78 acts on flange 112 of hub member 98 to urge the movable wall 125 toward shell 78.

A conduit 163 attached to check valve 167 connected to shell 96 connects chamber 130 with a source of vacuum 165.

Since the extended operation of control valve 133 is dependent on clean and substantially dry air, an end cap 166 is attached to shell 96.

End cap 166 has an interior baffle 168 with a series of openings 170, 172, 174, which are located in an arc above the axial center 176 of shell 96. Air can freely pass between shield surface 178 and baffle 168 through openings 170, 172, 174, see FIG. 2, into guide chamber 180 before passing through filter 182 adjacent passage 136. Should water or condensation accumulate in guide chamber 180, slot 184 should allow drainage to the surrounding environment without being presented to passage 136.

The actuator member 30 includes a brake pedal 190 which has a first end attached to pivot pin 192 and a second end with a pad 194 thereon. Push rod 196 has an eye on one end thereof which is attached to pin 198 on pedal 190 and a spherical surface 200 on the other end. Spherical surface 200 is retained in socket 202 on cylindrical member 204.

Cylindrical member 204 is attached to shaft 206 that extends substantially the entire length of sleeve 66. A pin 208 which extends through slots 210 and 212 in sleeve 66 secures sleeve or cylindrical valve member 145 to end 214 on shaft 206. Guide bearing 216 on the end of shaft 206 holds cylindrical member 204 in substantially the axial center of adjustment member 82. However, cylindrical member 204 has a tapered or rounded surface 220 adjacent socket 202 to prevent or avoid engagement with the adjustment member 82.

MODE OF OPERATION OF THE INVENTION

When a vehicle having an internal combustion engine is equipped with the brake actuation assembly 10, vacuum produced at the manifold 165 is communicated to chamber 130. With vacuum in chamber 130, any air present in chamber 128 is communicated to chamber 130 by way of opening 110, passage 138, bore 134, and passage 160. With vacuum in both chambers 128 and 130, return spring 162 urges the movable wall toward shell 78 and piston 68 in master cylinder 12 against adjustment mechanism or stop 82. As should be evident, a change in the position of adjustment mechanism 82 with respect to end bearing changes the relationship of end 85 of piston 68 and the flow path from port 44 past seal 58. Since spring 70 correspondingly moves piston 64, a similar relationship is established between end 65 and port 42 past seal 56. Thus, the flow path for fluid compensation between reservoir 46 and chambers 60 and 62 is established to set specification.

When an operator desires to effect a brake application, an input force is applied to pad 194 which causes pedal 190 to rotate about pivot pin 192 and provide push rod 196 with a linear input force. This linear input force moves shaft 206 allowing pin 208 to move within slot 210 to compress spring 147 as sleeve or cylindrical member 145 moves with shaft 206. Initial movement of cylindrical member 145 allows poppet 154 to engage vacuum seat 158 and interrupt fluid communication between chambers 128 and 130. Thereafter movement of cylindrical member 145 moves atmospheric seat 156 away from poppet 154 and allows air to flow from guide chamber 180 to enter chamber 128 and create a pressure differential across the wall 125 made up of diaphragm 124, backing plate 118, and end 102 of hub 98. This pressure differential acts on the wall and produces a force which is carried through to retainer 146 by way of cylindrical body 132, shoulder 142, and reaction disc 144.

This force acts on retainer 146 and moves sleeve 66 which unites the power assist apparatus 16 with piston 68 in the master cylinder 14. Movement of piston 68 by movement of sleeve 66 and piston 64 by way of spring 70 interrupt fluid communication with reservoir 46 and permit the fluid in chambers 62 and 60 to be pressurized. The pressurized fluid of chambers 60 and 62 is communicated to brakes associated with wheels 22, 24, 26, and 28 to effect a brake application corresponding to the input force applied to pedal 190.

During movement of the wall of the power assist apparatus 16, cylindrical member 100 of hub 98 engages bearing seal 163 and aids in maintaining the linkage in a substantially axial plane to avoid the introduction of lateral force in the master cylinder 14.

As the operational force develops across the wall in the power assist apparatus 16, a corresponding reaction force is produced which is transmitted through shell 96 to shell 78. Ribs 88 in shell 78 hold or resist axial deflection of shell 78 and as such this reaction force is transferred to the stationary wall 14 of the vehicle by the housing 32 of the master cylinder 12.

On termination of the input force by brake pedal 190, spring 147 moves atmospheric seat 156 into engagement with poppet 154 to interrupt the flow of air into chamber 128. Thereafter movement of sleeve 145 by spring 147 moves poppet 154 away from vacuum seat 158 to allow air to be evacuated from chamber 128 and initiate the elimination of the pressure differential across the wall in the power assist apparatus 16. As the pressure differential is reduced, spring 162 moves the wall toward shell 78 and pistons 64 and 68 toward stop or adjustment mechanism 82. When piston 68 engages adjustment mechanism 82 fluid communication is again instituted between chambers 60 and 62 and reservoir to allow for compensation of any fluid that may have been lost during the brake application.

We claim:

1. In a brake actuation assembly having a master cylinder and a power assist apparatus, said master cylinder having a housing connected to a stationary member, said housing having a bore therein with passages connected to a fluid reservoir, piston means located in said bore to define pressurizing chambers therein, said pressurizing chambers being connected to a fluid pressure responsive device, and said power assist apparatus having a first shell connected to a second shell to define a cavity, a wall for separating the cavity into first and second chambers, a valve connected to the wall for controlling fluid communication between said first and second chambers, and linkage means for connecting said wall with said piston means, and an actuator member responsive to an operational signal for supplying said valve with an input signal whereby a pressure differential is created across said wall, said pressure differential acting on said wall to develop an output force which moves said wall toward said first shell, said linkage moving said piston means toward said second shell to interrupt communication of the passages to said fluid reservoir and pressurize the fluid in said pressurizing chambers to operate said fluid pressure responsive device, characterized by said linkage means having an adjustment mechanism for positioning said piston means with respect to said passages to control the timing of the interruptions of the communication of fluid between said reservoir and bore on movement of said wall toward said first shell in response to the operation of said actuator member by the input signal, said linkage having a sleeve with a first end and a second end, said first end being secured to said wall and said second end being fixed to said piston means, said sleeve having a shoulder located between said first and second ends for positioning said valve with respect to said wall, a reaction mechanism located between said wall and said first end of said sleeve, said output force being applied to said first end for moving said piston means, said reaction mechanism responding to said output force to provide said actuator member with an indication of the output force, said actuator having a rod concentric to said sleeve and fixed to said valve, said rod and sleeve being independently moved during the operation of said valve and the movement of said piston means to produce a desired output force corresponding to said input force.

2. In the brake actuation assembly as recited in claim 1, wherein said valve is characterized by a housing having a bore therein with a first passage whereby said first chamber is connected to said second chamber and a second passage whereby said second chamber is connected to the surrounding environment, a cylindrical plunger located in said bore and having a seat thereon, a pin for fixing said plunger to said rod, a resilient disc having its periphery secured to said housing, and a resilient member acting on and urging said plunger toward a poppet to seal said second passage from said bore and permit said connection between said first and second chambers.

3. In the brake actuation assembly as recited in claim 2, wherein said second shell engages a ledge on said master cylinder, said shell having a substantially disc shape with a series of ribs that engage the ledge to provide structural rigidity to substantially prevent deformation during the development of said output force.

4. In the brake actuation assembly, as recited in claim 3 wherein said first shell has an annular projection that extends into said first chamber, said valve engaging said annular projection to maintain said sleeve and rod in the axial position of the cavity on movement of said wall toward said first shell.

5. In the brake actuation assembly as recited in claim 4, wherein a retainer located in a groove in said master cylinder housing engages said ribs to join said second shell with said master cylinder.

6. In the brake actuation assembly, as recited in claim 5, wherein said power assist apparatus is further characterized by a return spring that acts on said housing of the valve to move said piston means in said bore against said adjustment means to define a rest position.

7. In the brake actuation assembly as recited in claim 6, wherein said first shell is characterized by an end cap having a plate with a series of openings above a fixed position and a slot adjacent the periphery, said openings allowing free communication of air to the environment to the first passage while said slot allows for moisture to escape to the environment should condensation occur in said first passage.

8. In the brake actuation assembly as recited in claim 7, wherein said power assist apparatus further includes a return spring which acts on said wall to move said piston means against said adjustment mechanism and establish a rest position for said wall.

9. In a brake actuation assembly having a master cylinder and a power assist apparatus, said power assist apparatus having a return spring that urges a wall toward a rest position and a valve responsive to an input signal for controlling the development of a pressure differential that acts on said wall to create an output force to move the wall from the rest position toward an operational position, said master cylinder having a housing with a bore therein, said bore having passages for connecting said bore with a fluid reservoir and a pressure responsive device, piston means located in said bore, linkage means for connecting said wall with said piston means, said linkage moving said piston means toward said power assist apparatus on movement of said wall from said rest position to pressurize fluid in the bore and operate said fluid pressure responsive device, the improvement comprising:

adjustment means for positioning said piston means with respect to said passages to control the timing of the interruption of the fluid communication between said bore and reservoir on movement of said wall, said return spring urges said piston means toward said adjustment means in the absence of an input signal to provide communication through said passages into said bore for fluid in said reservoir, and an input rod that extends through said piston means to provide said valve with an input signal, said input rod having a shoulder that engages said piston means in the absence of the development of a pressure differential across said wall to manually move said piston means and pressurize the fluid in said bore to provide said pressure responsive device with operational fluid pressure.

10. In the brake actuation assembly as recited in claim 9, wherein said linkage means includes;

a tube with a shoulder located between a first end and a second end, said first end being rigidly attached to said piston means, said wall engaging said shoulder;
a resilient disc located between said wall and said second end; and
a fastener attached to said second end for holding said resilient disc against said hub, said output force being transferred from said wall to the tube by way of said resilient disc.

11. In the brake actuation assembly as recited in claim 10, wherein said valve includes:
a plunger located between said wall and said resilient disc;
a poppet having its periphery fixed to said wall and a central opening; and
a resilient member for urging said plunger toward said poppet; and
a pin for connecting said plunger to said input rod, said input rod acting through said pin for moving said plunger away from said poppet and permit said pressure differential to develop.

12. In the brake actuation assembly as recited in claim 9, wherein said power assist apparatus includes:
a front shell having an axial projection that engages said valve to hold said wall in axial alignment on movement thereof; and
a rear shell having a central opening with an axial flange, said axial flange engaging said housing of said master cylinder, said rear shell being substantially dome shaped with the apex located at said central opening, said flange having a series of radial ribs that engage said rear shell to provide support and reduce the possibility of deformation during the development of said pressure differential.

* * * * *